United States Patent

[11] 3,622,784

| [72] | Inventor | Louis R. M. Del Guercio |
| | | 14 Pryer Lane, Larchmont, N.Y. 10538 |
| [21] | Appl. No. | 872,092 |
| [22] | Filed | Oct. 29, 1969 |
| [45] | Patented | Nov. 23, 1971 |

[54] SENSOR-ANALYZER SYSTEM WITH MEANS FOR SELECTING OUTPUT SIGNALS CORRESPONDING TO ACCURATELY POSITIONED SENSORS
14 Claims, 21 Drawing Figs.

| [52] | U.S. Cl. | 250/71.5 R, 128/2.1 R, 250/83.3 R |
| [51] | Int. Cl. | G01t 1/20 |
| [50] | Field of Search | 250/65 R, 71.5 R, 83.3 R, 227; 128/2.1 R |

[56] References Cited
UNITED STATES PATENTS

| 3,086,123 | 4/1963 | Marchal | 250/71.5 X |
| 3,101,407 | 8/1963 | Shipman | 250/71.5 |
| 3,344,275 | 9/1967 | Marchal et al. | 250/71.5 |
| 3,495,084 | 2/1970 | Sheldon | 250/71.5 |

OTHER REFERENCES
Osborn et al.; Surgery; December, 1968; pp. 1057– 1070; 128– 2.1 R

*Primary Examiner*—Anthony L. Birch
*Attorney*—James and Franklin

ABSTRACT: An apparatus for monitoring the condition of body organs comprises detector means having a plurality of sensors, each of the sensors being effective to detect the condition of a body organ and to provide an output signal related to the detected condition, and means operatively connected to the sensors and effective to compare the output signal of each sensor with a predetermined nominal output signal corresponding to predetermined conditions of the body organs. Means are operatively connected to the comparator means and to the sensors to select those output signals bearing a predetermined relation to known output signals. The apparatus may be used in conjunction with an indicator material which is injected into the blood stream for passage through the specific body organs to be monitored. A radiant energy source is adapted to be positioned proximate the body organs so that the rays may be directed through the organs and through the indicator material, thereby to provide an output signal at the sensors proportional to the intensity of the rays passing through the body organs and the indicator material. In the preferred embodiment, the detector means comprises a plurality of spaced sensors which are arranged in a given array so that at least several of such sensors are positioned over the body organs to be monitored.

INVENTOR
LOUIS R. M. DEL GUERCIO

BY
James and Franklin
ATTORNEY

INVENTOR.
LOUIS R. M. DEL GUERCIO

BY James and Franklin
ATTORNEY

FIG. 8A — PULMONARY CAPILLARY FLOW

FIG. 8B — LEFT ATRIAL FLOW + SUPERIMPOSED AORTIC FLOW (REJECTED)

FIG. 8C — PULMONARY CAPILLARY FLOW

FIG. 8D — PULMONARY CAPILLARY FLOW

FIG. 8E — PULMONARY ARTERY FLOW + SUPERIMPOSED LEFT ATRIAL FLOW (REJECTED)

FIG. 8F — LEFT VENTRICULAR FLOW

FIG. 8G — PULMONARY CAPILLARY FLOW

FIG. 8H — RIGHT VENTRICULAR FLOW

FIG. 8I — LEFT VENTRICULAR FLOW

INVENTOR.
LOUIS R. M. DEL GUERCIO

BY James A. Franklin

ATTORNEY

SENSOR-ANALYZER SYSTEM WITH MEANS FOR SELECTING OUTPUT SIGNALS CORRESPONDING TO ACCURATELY POSITIONED SENSORS

This invention relates to medical apparatus and specifically to an apparatus for monitoring the condition of body organs such as the heart and lungs to determine malfunctions thereof.

The heart is a complex autoregulated double pump. It comprises a large number of working parts including a plurality of valves. A group of passageways (arteries) used to direct the flow of blood into and out of the heart and a number of entrance orifices and exit openings in the heart also form an integral part of the heart system. The evaluation of the efficiency capacity and function of these parts is an involved process which requires the passage of thin tubes or catheters to the heart through arterial passages. Such a procedure must be carried out in a surgically sterile area and as a result, a suitable environment for such measurements requires an extremely costly laboratory. In addition, skilled personnel are required to carry out the measurement procedure even when the proper environment is available. The cost for such procedures is therefore quite high and thus this type of measurement is available only to a limited number of patients. As a result, physiological evaluation of cardiac function is omitted in many instances where it could serve a highly beneficial purpose in the diagnosis and early discovery of malfunctions of the heart.

In order to overcome the many problems currently associated with this manner of heart malfunction detection, efforts are continuing to develop new measurement techniques and devices. However, most of the techniques currently used still require the use of a catheter at some point in the procedure. Alternatively, the drawing of blood from a patient together with the analysis thereof is employed in many instances to avoid the discomfort which accompanies the use of a catheter. However, the results obtained by the use of blood analysis or with the employment of a catheter are often not sufficient to provide the physician with an accurate estimate of the condition of the heart, particularly when the malfunction to be detected is in an early stage.

Several recent devices have therefore been developed which depend neither on the use of blood analysis or a tubelike instrument such as a catheter to obtain information regarding the function of the heart. In one device, a sensing element is placed over the heart and an energy wave is directed into the patient and through the heart. The intensity of the wave is detected by the sensing means after it is passed through a specific point within the organ, and the information obtained thereby is observed by the physician. While the condition of specific areas of the heart and other organs can be observed with this type of device, meaningful information can only be obtained by the skillful positioning of the sensor in relation to a specific site within the heart. This precise positioning is not only time consuming, thereby adding to the anxiety of the patient, but also requires the presence of a skilled individual who might otherwise be available for other medical duties. Auxiliary equipment useful to aid in the positioning of such sensing devices has been attempted, but without much general success. Furthermore, even if the specific location is, after tedious effort, properly obtained, the information received from the sensor in relation to that specific position may not be indicative of the malfunction which is known to be present. Thus, other critical areas of the heart must then be tested for malfunction until an accurate evaluation of the damaged area is achieved. The overall procedure then becomes inordinately complex and unnecessarily lengthy.

It is the primary object of this invention to provide an apparatus for monitoring the condition of body organs such as the heart in several critical locations without the need for employing the skills of an individual to precisely locate the sensors.

It is another object of this invention to provide an apparatus for monitoring the condition of body organs which compares and selects important and meaningful detected information and transmits this information to the physician for further analysis.

It is still another object of this invention to provide an apparatus for monitoring the condition of a body organ such as the heart which is characterized by its ability to provide information regarding a plurality of critical areas in the heart substantially simultaneously.

It is still a further object of this invention to provide an apparatus for monitoring the condition of a heart and other vital organs which is characterized by its simplicity and economy of manufacture.

Broadly, the apparatus of the invention comprises a detector means having a plurality of sensors each being effective to detect the condition of a body organ and to provide an output signal related to the detected condition thereof. Means are operatively connected to the sensors and are effective to compare the output signal of each of the sensors with predetermined nominal output signals corresponding to predetermined conditions of the body organs. Additional means may be operatively connected to the comparator means and to the sensors to select the output signals bearing a predetermined relation to the known output signals for transmittal to a physician for further analysis. With this apparatus substantially instantaneous information regarding the critical function of vital parts of body organs may be readily obtained by an attendant physician at the bedside of a patient. In the preferred form of the invention the comparator and selector means are combined in a single computer which may be located proximate the patient such as at a master control center in a hospital. The sensors are preferably individually mounted and operated so that the information derived by each may be transmitted to the computer center in a multiplex fashion for comparative analysis and selection. The selection process is sometimes necessitated by the inability of a sensor to clearly indicate meaningful information of a part because of the natural superimposed location of parts in various body organs such as the heart.

In one embodiment the apparatus of the invention further comprises means for generating energy rays and for directing the energy rays through an indicator material which is injected into the blood stream of a patient. Detector means such as the plurality of sensors is positioned opposite the generating means with the patient therebetween. With this arrangement the detector means is effective to provide an output signal proportional to the intensity of the rays after they are passed through the indicator material in the organ to be monitored. The detector means comprises a plurality of spaced sensors which are operatively positioned on a support member in a given array. The sensors are effective to detect the rays after they pass through the indicator material in the selected organ. Each of the sensors provides an output signal which is proportional to the intensity of the ray received by that sensor. The sensors are positioned at various locations relative to the organ to be monitored, and are effective to transmit information regarding the flow of blood through that organ.

In the operation of the apparatus a bollus of indicator material is injected into the blood stream of the patient. A plurality of sensors which are preferably operatively attached to a fixed support member in a predetermined array are placed beneath the patient in the general area of the organ to be monitored. A source of radiant energy, such as an X-ray generator, is aligned on the opposite side of the patient from the sensors so that the generated rays are directed through the patient and to the sensors. The bollus of indicator material arrives at the organs during the course of its flow through the blood stream of the patient. As the indicator material passes through the monitored organs, the sensors detect a decrease in the intensity of the X-rays since the bollus of indicator material is opaque to the passage of the X-rays. As a result each sensor is actuated to reduce its output signal in accordance with the density of the bollus of indicator material as it passes before that sensor. The output signal of the sensor increases as the density of the bollus decreases due to natural constriction through the body organs. Thus a contrast dilution curve (i.e. a curve of the density of indicator material) is formed at the output of each sensor. Means for measuring the output signal of each sensor is provided and a recording of the information is obtained. The recorded information is compared by a physician to conventional contrast dilution curves corresponding to the particular organs monitored and any malfunction of the organs is observed by a comparison of the curves detected and those which are considered standard. Specific location of the malfunction is quickly and accurately determined since conventional curves are available for each critical location in an organ such as the heart. Thus by observing which of the sensors provides the malfunction data and noting the organ part being monitored by a comparison with the standard curves for various parts, isolation of the part is achieved.

If a plurality of sensors are arranged at various locations of the heart, information regarding the flow of blood through these parts is readily obtained by an observation of the information produced from each of the sensors in those areas. By arranging the sensors in a fixed properly spaced array, a number of critical areas in virtually any body organ through which blood flow is to be measured can be easily affected. With this type of arrangement information from the heart area can be obtained virtually simultaneously with respect to the total cardiac output in terms of its function as a pump, the end diastolic volumes, pulmonary shunting which may be present, differential pulmonary blood flow on opposite sides of the heart, circulation times, valvular incompetence, stroke volume, pulmonary capillary perfusion, coronary sinus flow and pulmonary blood volume. Information regarding all of these heart functions particularly with reference to malfunctions thereof may be obtained furthermore by a simple positioning of the sensors in the general area of the heart.

Although the arrangement of a plurality of sensors in a predetermined array is effective to provide information regarding a body organ such as the heart which is meaningful and which is obtainable without the need of a skilled technician to properly position the sensors in critical areas, some sensors in this array produce an output signal which is unintelligible. This is partly due to the natural superimposition of vital parts in an organ such as the heart so that one sensor will record information regarding the function of two parts at the same time. To avoid the need of selection and rejection of this information by an attending physician and in order to reduce to an absolute minimum the error possibilities of interpretation and diagnosis of malfunctions based upon such information, an automatic comparison and selection means may be provided as before mentioned. If such a means, for example, a computer, is employed in this manner, only those signals having significant information relative to predetermined conditions of the body organs as programmed into the computer in the form of information curves will be transmitted back to the physician at a bedside. With this arrangement the positioning of the sensor may be done in an unskilled manner without any special concern for the inability to properly locate specific parts of the organ. If no critical part is monitored by a specific position of the sensors, then a shift in position may immediately be made since the realization that no critical part is being monitored will automatically and substantially immediately be transmitted to the bedside of the patient in the form of unintelligible curves. An immediate shift in position of the sensors can then again indicate whether or not critical parts of the organs are being monitored. Since a large plurality of sensors are proximately positioned on a support member such a shifting of sensor position will generally not be necessary, but if it is necessary an immediate indication thereof will be obtained.

For best results the sensors, which in the preferred form are semiconductor avalanche detectors, are positioned on a support member in a given array. The mathematical relationship relative to the spacing of the several sensors is based upon anatomic tables regarding the size of the heart in various diseased conditions. The spacing will vary with changes in heart size from patient to patient. Thus, the grid arrangement may well be different for a child than it will be for a full grown adult. The sensors may be arranged at substantially equidistant intervals in a substantially rectangular array to form a network of horizontal and vertical aligned groups.

To the accomplishment of the foregoing and to such other objects as may hereinafter appear, the present invention is related to an apparatus for monitoring the condition of body organs as defined in the appended claims, and as illustrated in the accompanying drawings wherein:

Figure 1:
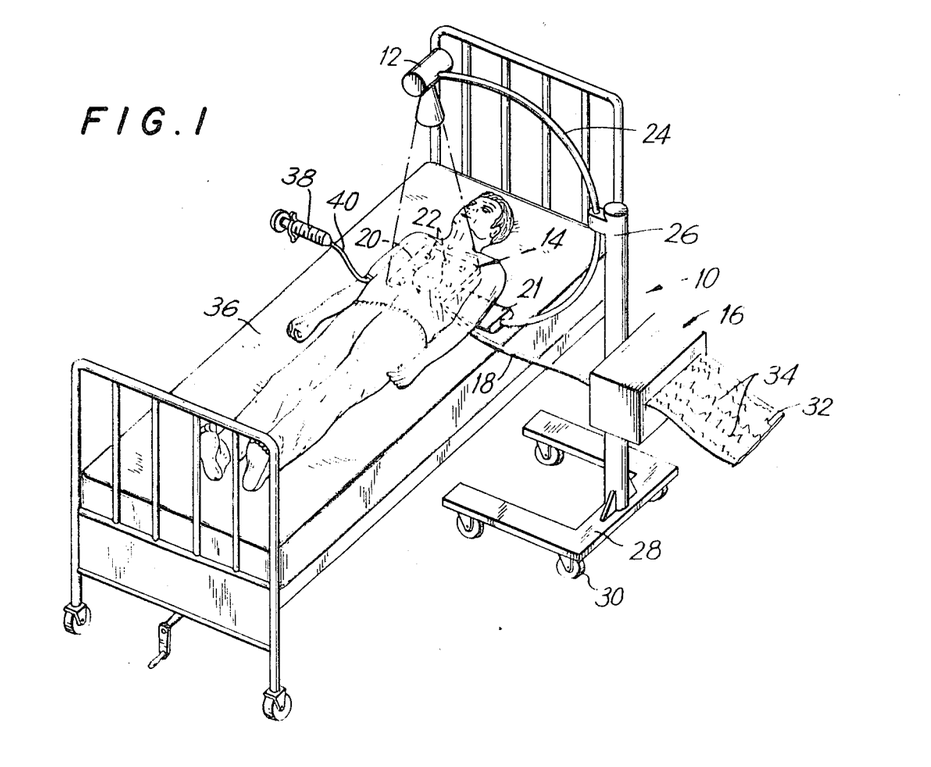
FIG. 1 is a pictorial representation of an apparatus for monitoring the condition of body organs.

Referring first to FIG. 1 of the drawings, an apparatus generally designated 10 for monitoring malfunctions of the heart, lungs or other vital organs, comprises a radiant energy source 12, a detector means 14, and a recording means 16. A conducting means 18 connects the detecting means 14 with recording means 16, thereby enabling the output signal of the detector means to be recorded. The detector means (see FIG. 10) comprises a support member 20 on which several sensors 22 are mounted. The radiant energy source 12, which is here shown as an X-ray generator, is movably attached to one end of the C-frame 24 which is held by a support post 26. The detector means 14 is connected to a power supply unit 21 at the opposite end of the C-frame 24 and is substantially aligned with the X-ray generator 12. The support 26 is mounted on a U-shaped dolly 28 which is movable along the floor on wheels 30. The recording means 16, here shown as a pencil actuated recorder, is also attached to the support post 26. Recording paper 32 is operatively connected to the recorder 16, and as illustrated, records the output signals from the several sensors 22 in the form of graphs 34.

A bed supports the patient in a position between the detector means 14 on one side, and the X-ray generating source 12 on the other. An injection device, such as a hypodermic syringe 38, is illustrated in its position of use. An intravenous tube 40 is inserted into the patient's arm and is attached to the syringe 38.

In the operation of the apparatus illustrated in FIG. 1, the support member 20 carrying the several sensors 22 is positioned beneath the patient, generally in the area of the heart and lungs. The X-ray source 12, because of its attachment through the C-frame 24 to the support 20 is substantially aligned with the sensors 22 so as to direct its rays through the patient and to the sensors. An indicator material such as HYPAQUE (registered trademark) is then passed from the needle 38 through the intravenous tube 40 into the patient's blood stream. After several seconds have elapsed, the bollus of indicator material which has been injected will arrive at the organs which are positioned proximate sensors 22. As the indicator material continues to pass through the blood stream it travels a normal bloodstream path through the heart and lungs. The several sensors 22 are located so as to detect a change in intensity of the X-ray beams due to the interference presented by the indicator material as it passes before the sensor. The output signals from the sensors are transmitted through the conducting means 18 to the recorder 16, and converted into the several graphic illustrations 34 on the paper 32. At least some of the sensors 22 are located proximate organ parts for which predetermined graphic illustrations are expected in accordance with the normal passage of the blood through that location. If a malfunction occurs at any of the sensor locations, the malfunction will be indicated by the variation in the graphic representation of the output signal of that sensor from the predetermined norm. An examination of the graphic illustrations 34 by a physician positioned at the bedside will immediately determine any serious malfunctions in the parts of the organs being monitored.

Figure 2:
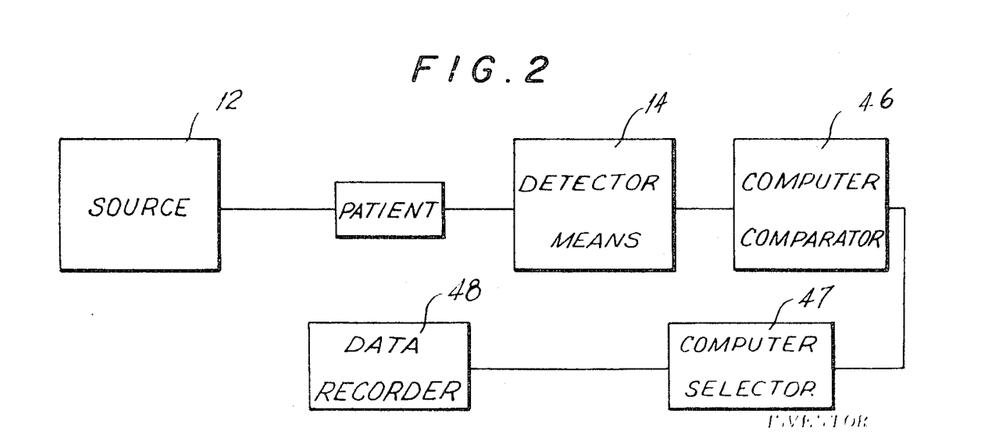
FIG. 2 is a block diagram of a system which may be employed for monitoring the condition of the body organs.
Figure 8A:
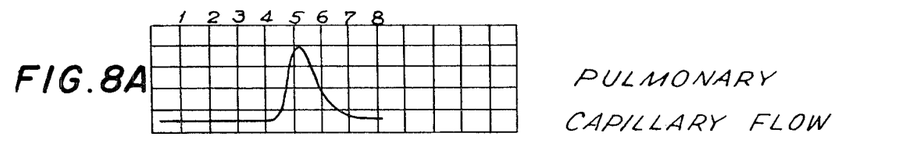
FIGS. 8A through 8I are graphic illustrations of data received from sensors in typical positions illustrated in FIGS. 4 through 7 at various parts of the heart and associated organs.

The comparison of the output signals from the several sensors may be performed by other devices in the system. FIG. 2 illustrates by way of a schematic arrangement of components, a system which is suitable for comparing and selecting meaningful output signals for further analysis by the physician. As there illustrated, the source 12 is positioned on one side of the patient and the detector means 14 which in the illustration of FIG. 1 comprises the support 20 and the sensors 22, is positioned on the other side of the patient. The output signal of the detector means, that is the separate outputs of each of the sensors, is fed in multiplex fashion to a computer comparator 46. This computer comparator 46, which may be any suitable conventional computer, is programmed to store information regarding the proper functioning of the several organs to be monitored. The standard contrast dilution (indicator material) curves (FIGS. 8A, C, F, and H, for example) for the several vital parts of a heart may be previously programmed into the comparator 46. The comparator may then be actuated to compare the standard curves with the output curves from the sensors. A selector means 47, preferably a part of the same computer as comparator 46, then selects those output sensor curves which have a predetermined relation to the standard curves. These selected curves are then passed to the recorder 48 which may be located at the bedside of the patient. A physician who may be in attendance at the time of the monitoring procedure receives the selected information in a few seconds for further analysis and detection of organ malfunction. Thus an early diagnosis of premature maladies may be made accurately. Furthermore, only significant information corresponding to properly positioned sensors is transmitted, thus eliminating the extraneous information. If little or no desired information is obtained by the initial placement of the sensor array, this will be quickly determined and a shift of the sensors may then be effected until the sensors are properly located.

Digital computers have been used for pattern recognition and specifically have been programmed for acceptance of information such as a dilution contrast curve. One commercially available computer manufactured by International Business Machines Corporation, namely Model 360-67 is a digital computer which is capable of accepting and storing standard contrast dilution curves. The programming of the standard curves may be carried out by the use of an Rand Tablet which is a device useful for tracing curves with an implement such as a stylus. The actual curve tracing may be done manually by the programmer and an analog-digital computer converts the information impressed on the Rand Tablet to a digital code which is acceptable to the computer. In the alternative, and more preferably, the information is fed directly into the digital computer from the sensors, since the output signal of the sensors as hereinafter explained is in the form of incremental pulses which define the curve corresponding to the passage of the indicator material before that sensor. The programming of contrast dilution curves of the type hereinafter described has been carried out at the International Business Machines Watson Research Center in Yorktown Heights, New York. Such programming is referred to in the article entitled "Computer Programs for the Hemodynamic Assessment of the Critically Ill" by R. M. Goldwyn, A. M. Katcher, J. H. Siegel and L. L. Richman, appearing in the proceedings of the Annual Conference on "Engineering in Medicine and Biology," Vo. 9, page 30, 1967 and also in the article entitled "The Analysis of Physiologic Abnormalities in the Critically Ill Using a Time-Shared System for the Conversational Manipulation of a Large Data Bank" by R. M. Goldwyn, L. Loh, and J. H. Siegel, appearing in the proceedings of the "Annual Princeton Conference on Information Sciences and Systems."

Thus, the computer may be readily programmed to store information regarding the function of various body organs and parts thereof in the form of standard contrast dilution curves. The output information of the plurality of sensors may then be individually and sequentially programmed directly into the computer. The computer receives as input information the output curves from the sensors and in response to this information compares these curves with the previously programmed curves. Each sensor curve is compared with each standard curve and if it resembles closely any of the standard curves, the computer is actuated thereby to pass this curve to the output. This selected curve is then passed to a recorder which may be placed at the hospital bedside. If a sensor curve does not closely resemble a standard curve, it will actuate the computer to block its passage out of the computer, thereby being rejected by the computer. In this manner the selection and rejection of the output curves from the sensors are automatically and quickly carried out by the computer mechanism.

The number of selected curves will depend upon the proper positioning of the sensors over vital parts of the organ to be monitored. Some of the input curves to the computer from the sensors will be rejected by the computer, since a comparison with the stored curves will indicate that these inputs bear no known relationship. Thus, only information regarding properly positioned sensors will be recorded and analyzed by an observer at the recorder at the patient's bedside. Because of the close array of the sensors, many of the sensors will produce output curves which are selected.

Figure 3:
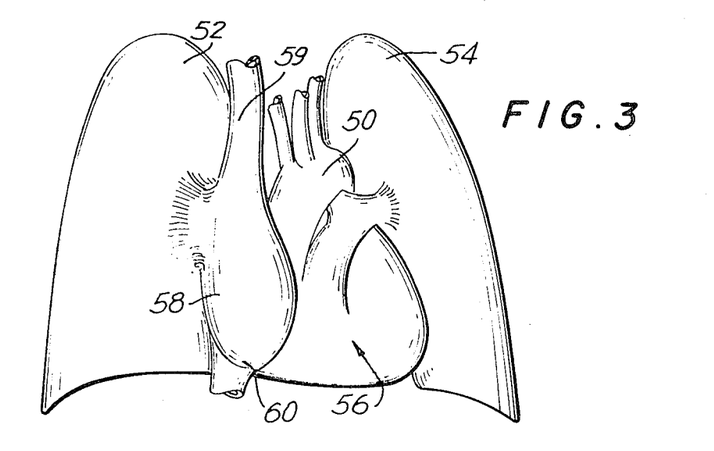
FIG. 3 is a pictorial representation of a heart muscle.

The function of the detector means 14 shown in FIG. 1 may best be described with reference to a specific organ to be monitored. FIG. 3, for example, shows a heart muscle with several of the more prominent parts illustrated. Thus, the aorta 50 is shown positioned between the right lung field 52 and the left lung field 54. The heart shadow is designated by the numeral 56 and is shown as it would appear on a fluoroscope.

Figure 4:
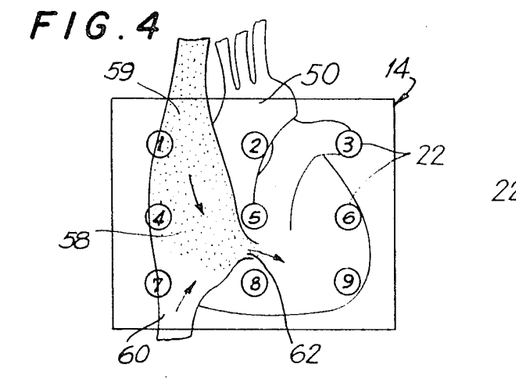
FIG. 4 is a schematic illustration of the position of an array of sensors over the heart muscle illustrated in FIG. 3.
Figure 5:
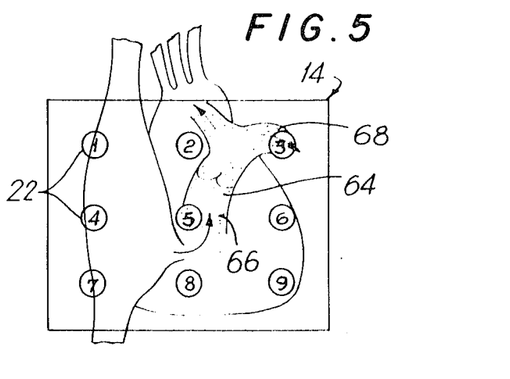
FIG. 5 is a schematic illustration of an array of sensors positioned over a heart muscle as illustrated in FIG. 4 with another portion of the heart emphasized.

The specific parts of the heart which are preferably monitored are illustrated in FIGS. 4 through 7. The detector 14 is illustrated in each of these figures as being positioned generally over the heart. For illustrative purposes nine sensors each designated with a numeral (1 through 9) are shown in their relative positions superimposed above the heart. In FIG. 4 sensors 1, 4 and 7 are shown positioned generally in the area of the right atrium 58. The sensor 1 is positioned proximate the superior vena cava 59 while the sensor 7 is positioned proximate the interior vena cava 60. The tricuspid valve 62 is positioned between sensors 5 and 8, and as indicated by the arrows, discharges the blood from the right atrium 58. FIG. 5 indicates that sensor 5 is positioned proximate the main pulmonary artery 64 and above the right ventricle 66. Sensor 3 is positioned over the left pulmonary artery 68.

Figure 6:
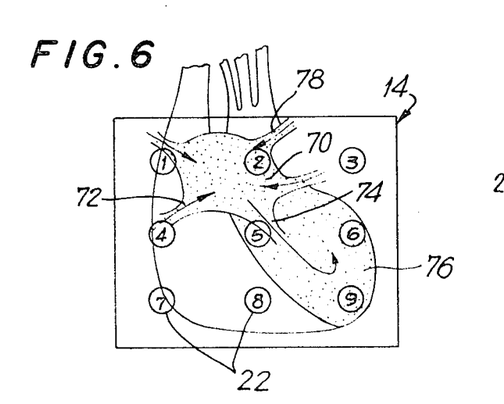
FIG. 6 is a schematic illustration of an array of sensors positioned over a heart muscle as shown in FIGS. 4 and 5 with still another portion of the heart emphasized.
Figure 7:
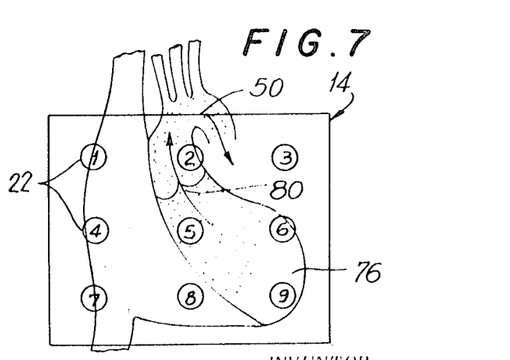
FIG. 7 is a schematic illustration of an array of sensors positioned over a heart muscle with yet another portion of the heart emphasized.

In FIG. 6 the sensor 2 is shown positioned above the left atrium 70. Sensor 4 is also shown to be proximate the right inferior pulmonary vein 72 while sensor 5 is positioned almost directly above the mitral valve 74. Sensors 6 and 9 are positioned above the left ventricle 76. As shown in FIG. 6 sensor 2 is also positioned near the left superior pulmonary vein 78. In FIG. 7 the sensors 2 and 5 are also shown to be located below the aorta 50 and the aorta valve 80.

Figure 8B:
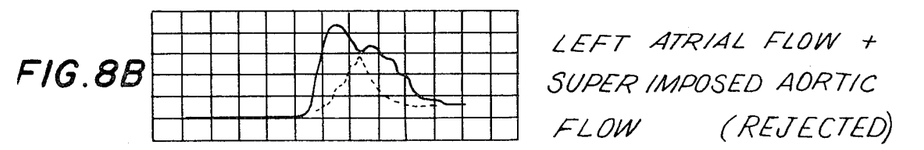
Figure 8C:
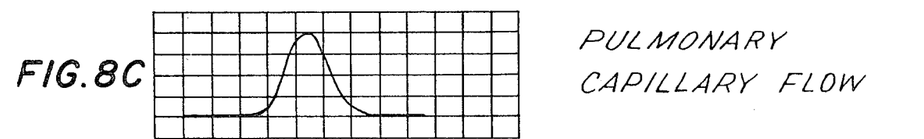
Figure 8D:
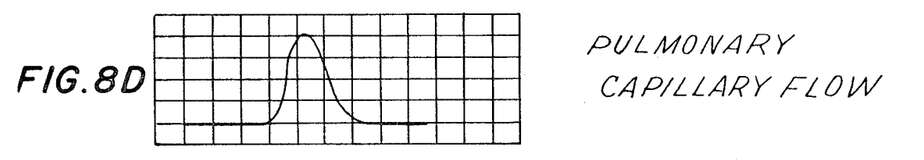
Figures 8E, 8F:
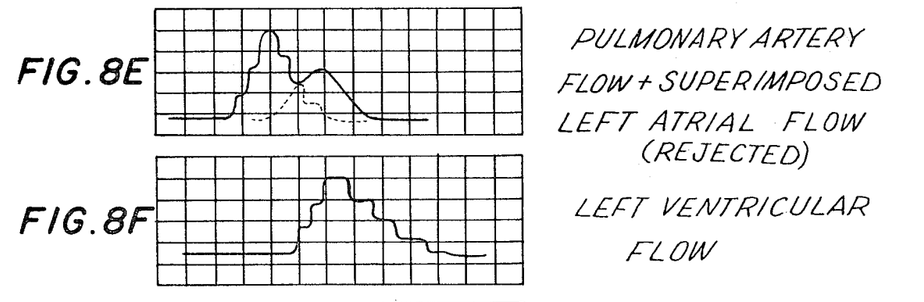
Figure 8G:
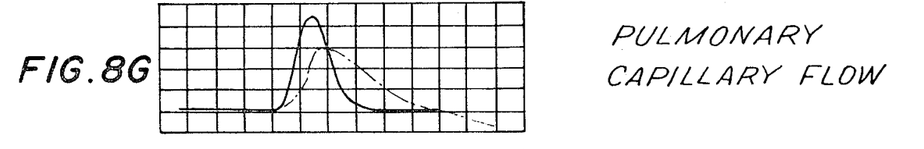
Figure 8H:
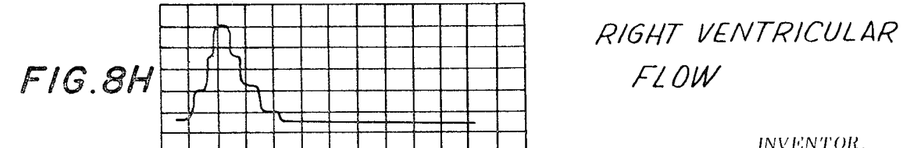
Figure 8I:
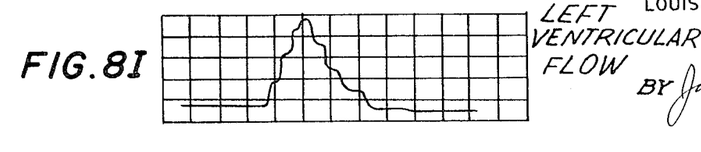
Figure 9:
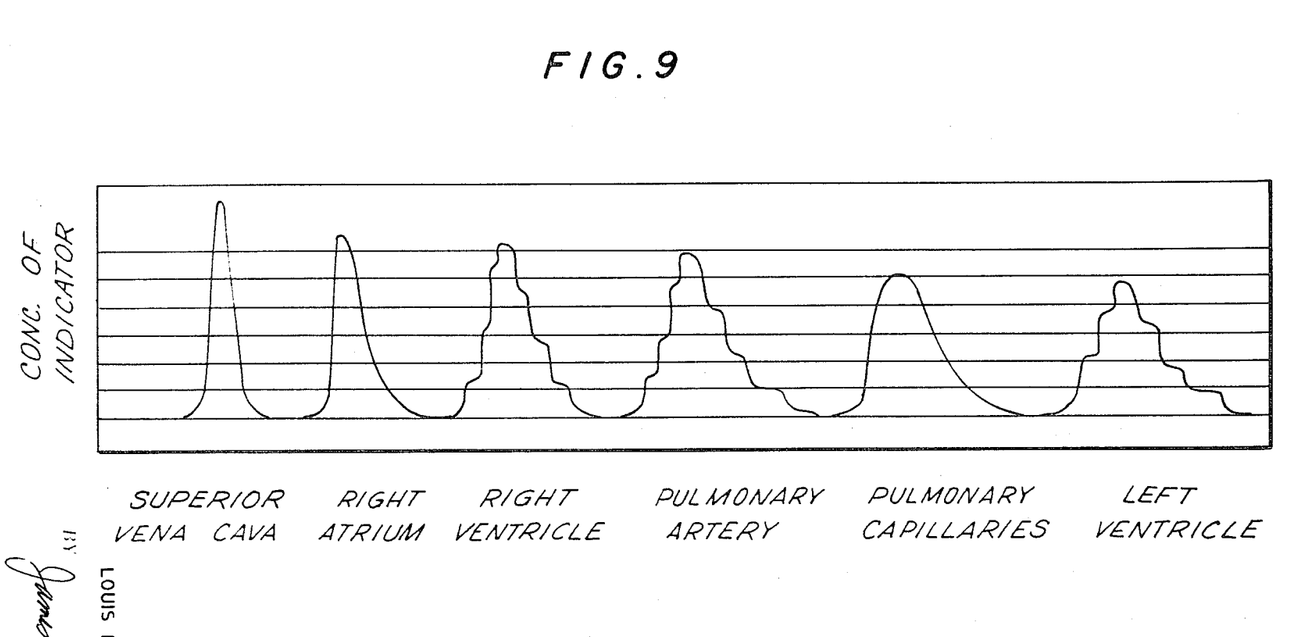
FIG. 9 is a graphic illustration of the passage of indicator material through the various sections of the heart and associated organs, and indicates the normal dilution of the indicator material during the course of such flow.

The information received from the sensors is shown in graphic form in FIGS. 8A through 8I, and in FIG. 9. These graphs represent as a function of time the output signal of each sensor which is positioned to monitor the body parts noted on the side of the drawing. The graphs are shown in inverted form as is the conventional practice with graphs of this type. Thus, in FIG. 8A, for example, the X-ray intensity detected by a sensor positioned over a pulmonary capillary would decrease as a function of time until the indicator material has passed. The curve is generally bell shaped since the detection of the indicator material is directly proportional to the form of the bollus of the indicator material. Because of the normal constrictions the bollus must pass through as it flows through the blood stream, it assumes a form which is more dense at the central portion than at the peripheral portions. As a result the generally bell shaped curve illustrated in several of the figures is normally produced.

Since the heart is a multilevel device blood will flow through an upper portion and through a lower portion sometimes substantially simultaneously. A sensor positioned above both portions (such as sensors No. 2 and No. 4 in FIGS. 4-7) will therefore transmit information regarding both portions. The curve recorded however, as illustrated in FIGS. 8B and 8E, is relatively unusable in terms of comparison with standard information to be expected for anyone of the parts, and so the curves are indicated as being rejected. However, information regarding the specific arteries or valves which are superimposed in this manner may be obtained by inspecting other curves in the areas proximate to these superimposed areas.

It will be noted that several of the curves, namely 8F, 8H and 8I, appear as step function outputs when presented in graphic form. This is due to the normal pulsation of blood through the areas represented by these curves. Generally a step function is obtained in valvular areas of the heart. On the basis of the ratios of indicator concentration which may be obtained from observation of each step function, the end diastolic volume of the chamber can be calculated. The end diastolic volume of the heart chamber is a most sensitive measure of myocardial performance, because as the heart muscle begins to fail, the end diastolic volume increases long before the actual pump output of the chamber begins to fall off. Another meaningful advantage of the step function which are graphically recorded is that a horizontal step function suggests that there is no valvular incompetence but a sloping step function indicates a leakage of a cardiac valve. The shape of the step is related to the degree of valvular incompetence so that analysis of the slope is helpful in detecting the presence of and the degree of incompetence of any of the valves of the heart.

FIG. 9 indicates the order of flow of the blood through the various sections of the heart. As noted, the blood flows from the superior vena cava to the left ventricle through the several intermediate ventricles, arteries and capillaries. It will also be noted that the bollus of indicator material is diluted by a certain amount, i.e. the difference in vertical position of the peaks of the first and last curves in FIG. 9, during its flow through the blood stream. This dilution in concentration of the indicator material is considered in the evaluation of the curves observed in FIGS. 8A through 8I.

From the illustrations of FIGS. 3 through 9, it will be appreciated that the exact positioning of the sensors over the heart need not be tediously undertaken, since at least several of the sensors will be necessarily positioned over important sections of the heart and those that are not so positioned may readily be rejected with the system of FIG. 2. By a proper selection of the spacing between the sensors an assurance of at least three or four of the specific sections illustrated in FIGS. 4 through 7 will be located by the sensors. The spacing of the sensors is dependent upon the size of the heart, if the heart is the organ to be monitored. Obviously the size of the heart is quite variable and therefore an exact indication of spacing is dependent upon anatomic tables regarding the various sizes of the heart in diseased conditions or otherwise. A sensor spacing of about two centimeters between sensors is generally suitable for most situations. One arrangement of the sensors is provided on a frame measuring 10 inches by 10 inches and incorporating sixteen sensors aligned and equally spaced in four rows and four columns. This arrangement is illustrated in FIG. 10.

Figures 10, 11, 12:
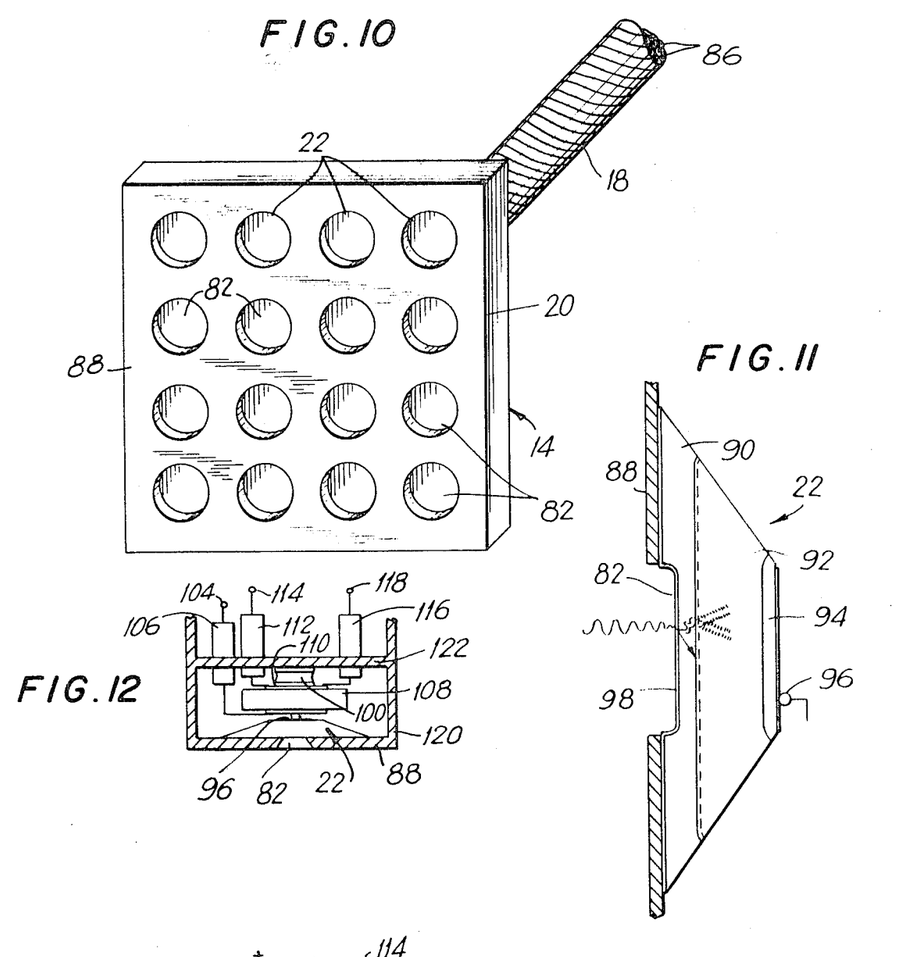
FIG. 10 is a perspective view of a detector device typically employed in the apparatus of the invention.
FIG. 11 is a side elevational view partly in section of a sensor which may be employed in the device of FIG. 10.
FIG. 12 is a front elevational view partly in section of the components employed with the sensor illustrated in FIG. 11.

FIGS. 10-14 illustrate the detector means 14 and components thereof in greater detail. As shown in FIG. 10, the support member 20 comprises a rigid frame housing the sensors 22. While the individual sensors may be movably mounted on the support 20, if desired, they are here shown as being attached to the frame so that the sensors are maintained in a given array upon the movement of the support 20. Each sensor includes a window 82 located opposite source 12 (FIG. 1), and also proximate a critical area of the organ to be monitored during the operation of the device. The size of the windows 82 may be varied with the size of the support 20, and the spacing between windows on the support 20. As shown, the conducting means 18 includes a plurality of wires 86, each of which is electrically tied to the output of a sensor 22.

Referring to FIG. 11, a suitable sensor 22 which may comprise an avalanche detector is illustrated. The sensor 22 includes an outer surface 88 into which the window 82 is cut. The sensor is composed of several layers of semiconductor material. One layer shown as area 90 is composed of a P+ type material such as a gallium-diffused material. The area 92 adjacent area 90 is composed typically of an N type material. An aluminum surface layer 94 is positioned in contact with the N type layer 92. A junction terminal 96 is attached to the area 94 for connection to a source of bias voltage for the device. A layer of gold material 98 is placed on the surface area 90 at the surface proximate the window 82.

The particular detector illustrated provides a fast response signal which is generated when the surface 98 is struck with an X-ray beam. Charge multiplication of 100 to 1000 times is achieved with the application of a bias voltage in the area of 1500 to 1800 volts for a device of the type shown. In addition, the use of a P+—N junction is advantageous to provide a signal-to-noise ratio advantage. If the signal is generated near the front surface 98 it is multiplied to a greater extent than the average noise components. By coupling this detector to an ordinary low noise amplifier, it is therefore possible to detect pulses which would be lost in noise without avalanche amplification. A further advantage of the use of a detector such as this is its low capacitance per unit area which results from the use of a wide depletion area.

Figure 13:
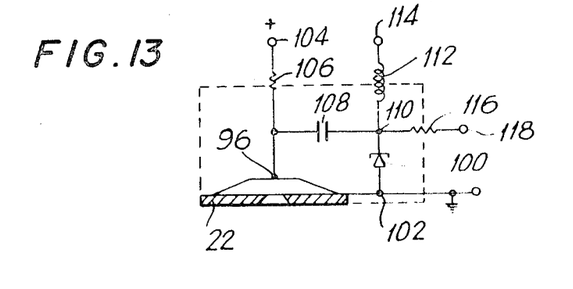
FIG. 13 is a schematic illustration of the circuitry employed with the sensor of FIG. 11.

The inherent signal-to-noise charge ratio within the avalanche detector can be utilized to best advantage by coupling the detector to a noncharge integrating circuit. Such an arrangement is illustrated in FIG. 13. Referring to FIG. 13, the avalanche detector or sensor 22 is shown operatively connected to a tunnel diode 100. The junction 102 of the detector and the diode is grounded and forms an output terminal. Terminal 96 on the detector 22 is connected to a source of bias voltage at terminal 104 through resistor 106. A capacitor 108 is connected between the terminal 96 and the junction 110 which is connected to the other side of the tunnel diode 100. An inductor 112 is joined to the junction 110 and to the terminal 114 which may also be connected to a source of low bias voltage. A resistor 116 is connected between junction 110 and the output terminal 118.

The sensing of the radiant energy wave at the surface 98 of the avalanche detector 22 is translated into a pulse across the junction capacitance between the tunnel diode and the avalanche detector. The pulse width is primarily controlled by the inductor 112. The magnitude of the inductor 112 should not be reduced below its effectiveness as a radio frequency choke to control the radiation rise of the induced charge pulse at the contacts of the avalanche detector.

The tunnel diode is selected to have a capacitance which is approximately 10 percent of the capacitance of the avalanche detector depletion region 92. Under these conditions the tunnel diode stores only 10 percent of the induced charge collected in this depletion region. The resulting voltage pulse across the tunnel diode junction is sufficient to trigger a typical transistor line driving stage which may be operatively connected to the tunnel diode (not shown) and driven thereby.

The time of response between the initial formation of electrons after the striking of X-ray beams in the avalanche detector can be made to be less than the total collection time of the induced charge caused by the movement of these electrons. This is accomplished by adjusting the charge threshold capability of the tunnel diode in the standard manner. As the threshold is reduced to a smaller percentage of collected charge, the response time is also reduced.

FIG. 12 illustrates a packaging arrangement of the several components shown in FIG. 13 which is designed to reduce stray capacitances and to utilize the full operational characteristics of the circuitry. The sensor 22 is operatively connected to the frame 120 which also supports the tunnel diode 100. The capacitor 108 is also connected to the frame between the detector 22 and the tunnel diode 100. The inductor 112 is mounted above the tunnel diode on the extended segment 122 of the frame 120.

With the detector arrangement illustrated in FIGS. 10 to 14 the overall system may operate with a high sensitivity to X-ray beam generation substantially independently of noise generation. In view of the fact that the intensity of the beam is reduced by the indicator material as it passes before the sensor, the ability of the arrangement illustrated to detect energy rays of a very small value is important to the ability of the system to provide output curves from the sensors having an accurate indication of the signals transmitted. Thus, difficulties normally encountered with noise in a system of the type described are virtually eliminated by the use of such a sensor and circuit. A suitable silicon avalanche detector unit is available from the General Electric Co., and a full description of the integrator circuitry employed with such a detector is illustrated in FIG. 13 and is described in "Applied Physics Letters," Volume 9, No. 6, dated Sept. 15, 1966, in an article entitled "A New Ionizing Radiation Detection Concept which Employs Semiconductor Avalanche Amplification and the Tunnel Diode Element."

From the foregoing it will be appreciated that the apparatus of the invention provides a simple and accurate device for monitoring the conditions of body organs. With such an apparatus the discomfort of a patient during the monitoring procedure is minimized and virtually eliminated, and the information obtained includes data which enables the physician to detect malfunctions of the body organs in any of a number of locations within the body organs quickly and accurately. Early detection of certain malfunctions in vital organs such as the heart may readily be obtained. Furthermore the process of analysis beginning with the initial monitoring procedure and ending with the physician's diagnosis based on the information received may be carried out with the use of automatic auxiliary equipment for the comparison and selection of the information which is sensed by the detecting devices. As a result, the apparatus of the invention provides a satisfactory solution to long standing problems in medical testing procedures, and specifically in the detection of malfunctions of the heart.

While only one embodiment of the invention has been disclosed it is apparent that many modifications of the apparatus and method described may be made without departing from the scope of the invention.

I claim:

1. An apparatus for monitoring the condition of body organs comprising detector means having a plurality of sensors, said sensors each being effective to detect the condition of a body organ and to provide an output signal related to the detected condition thereof, automatic means operatively connected to said sensors and effective to compare the output signal of each of said sensors with a predetermined nominal output signal corresponding to the expected output signal from a particular part of the body organ, and automatic means operatively connected to said comparator means and said sensors and effective to select only the output signal or signals bearing a predetermined relation to said nominal output signal, and means operatively connected to said comparison and selection means for providing an output indication of the selected output signal or signals, whereby the output indication includes only the output signal or signals from the sensor or sensors accurately positioned in registration with said particular part of said body organ.

2. In the apparatus of claim 1, recording means operatively connected to said selector means and effective to record the selected signals.

3. The apparatus of claim 1, in which said detector means further comprises a support member, said sensors being closely positioned proximate each other on said support member.

4. The apparatus of claim 3, in which said sensors are arranged on said support member in a given array, and said support member is adapted to maintain said sensors in said given array when said sensors are positioned relative to the body organs.

5. A method of determining the condition of body organs comprising:
   a. positioning a detector means proximate the body organs, said detector means having a plurality of sensors mounted on a support member, said sensors being effective to detect the condition of the body organs and to provide an output signal related to the detected condition thereof,
   b. monitoring the output signal of each of said sensors,
   c. automatically comparing the output signals from said sensors with a predetermined nominal output signal corresponding to the expected output signal from a particular part of the body organs, and
   d. automatically selecting only the output signal or signals having a predetermined relation to said nominal output signal, whereby the output indication includes only the output signal or signals from the sensor or sensors accurately positioned in registration with said particular part of said body organs.

6. In the method of claim 5, the step of recording the selected output signals.

7. An apparatus for monitoring the condition of a body organ in conjunction with an indicator material which is placed in the body for passage through the body organ comprising means adapted to be operatively positioned externally of and proximate to the body organ and effective to generate radiant energy rays and for directing said radiant energy rays through the body organ, detector means adapted to be operatively positioned opposite said generating means and 8. The apparatus of claim 7, in which said sensors are arranged in a substantially rectangular array on said support member.

9. The apparatus of claim 7, in which said sensors are arranged on said support member to form several groups of aligned sensors.

10. In the apparatus of claim 7, a C-shaped mounting member operatively connected at one end to said detector means and at the opposite end to said generating means whereby said detector means and said generating means are substantially aligned by said mounting member.

11. In the apparatus of claim 7, means operatively connected to said sensors and effective to record the output signal of each sensor as a function of time.

12. The apparatus of claim 7, in which said sensors are spaced about two centimeters from each other.

13. In the apparatus of claim 7, at least one sensor displaced a given distance from said plurality of sensors, whereupon when said detecting means is positioned proximate said body organ said displaced sensor is positioned to simultaneously detect the passage of said energy rays through a second body organ while said plurality of sensors detects said energy rays passing through said first body organ.

14. In the apparatus of claim 7, in which the body organ to be monitored is a heart muscle, a second plurality of sensors operatively connected to said support member and spaced given distances from said first plurality of sensors, whereupon when said detecting means is positioned to detect said radiant energy rays passing through the heart muscle, said second plurality of sensors are positioned to detect said radiant energy rays after passage through blood stream flow positions located before passage and after passage through the heart muscle.

* * * * *